(12) United States Patent
Jonsson (10) Patent No.: US 9,658,084 B2
(45) Date of Patent: May 23, 2017

(54) RESOLVER POSITIONING SYSTEM, ROBOT AND METHOD THEREFOR

(71) Applicant: ABB Schweiz AG, Baden (CH)

(72) Inventor: Ingvar Jonsson, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/443,988

(22) PCT Filed: Nov. 19, 2012

(86) PCT No.: PCT/EP2012/072999
§ 371 (c)(1),
(2) Date: May 19, 2015

(87) PCT Pub. No.: WO2014/075744
PCT Pub. Date: May 22, 2014

(65) Prior Publication Data
US 2015/0292909 A1   Oct. 15, 2015

(51) Int. Cl.
*G01D 5/20* (2006.01)
*G01B 7/004* (2006.01)

(52) U.S. Cl.
CPC ............... *G01D 5/20* (2013.01); *G01B 7/004* (2013.01); *G01D 5/204* (2013.01)

(58) Field of Classification Search
CPC ....... G01P 3/488; G01P 1/026; G01D 5/2033; G01D 5/2013; G01D 11/245; G01D 5/20; G01D 5/204; G01B 7/004
See application file for complete search history.

(56) References Cited

U.S. PATENT DOCUMENTS

| 4,472,669 A | * | 9/1984 | Denham | ............... G01D 5/242 318/632 |
| 4,712,106 A | * | 12/1987 | McNally | ............... G08C 19/46 318/661 |

(Continued)

FOREIGN PATENT DOCUMENTS

| CN | 102257361 A | 11/2011 |
| EP | 0406740 A1 | 1/1991 |

(Continued)

OTHER PUBLICATIONS

First Chinese Office Action Application No. 2012800766132 Issued: Mar. 21, 2016 4 pages (translation only).

(Continued)

*Primary Examiner* — Jermele M Hollington
*Assistant Examiner* — Suresh K Rajaputra
(74) *Attorney, Agent, or Firm* — Whitmyer IP Group LLC (57) ABSTRACT

The present invention relates to a resolver positioning system for a robot, which system is connectable to a battery supply (402) and is drivable in a pulsed mode. The system comprising: a resolver (32) arranged to detect an axis position of a robot; a first comparator (80, 81) connected to the resolver for reading of a first resolver value from the resolver, wherein the first comparator comprises means (82-87) to provide two different reference levels for the first resolver value; a second comparator (80, 81) connected to the resolver for reading of a second resolver value from the resolver, wherein the second comparator comprises means (82-87) to provide two different reference levels for the second resolver value; and a controller (20) connected to the first and second comparators, wherein the controller is configured to provide a quadrant evaluation of the axis position from the first and second resolver values.

11 Claims, 5 Drawing Sheets

(56) References Cited

U.S. PATENT DOCUMENTS

| | | | | |
|---|---|---|---|---|
| 4,972,186 A * | 11/1990 | Morris | ............... | G01D 5/243 |
| | | | | 318/605 |
| 5,038,272 A * | 8/1991 | Calcagno | ............ | G05B 19/33 |
| | | | | 318/563 |
| 5,075,870 A * | 12/1991 | Kojyo | ............ | G05B 19/4067 |
| | | | | 700/254 |
| 5,134,404 A * | 7/1992 | Peterson | ............ | H03M 1/485 |
| | | | | 318/605 |
| 5,198,735 A * | 3/1993 | Taylor | ............... | G05B 19/33 |
| | | | | 318/565 |
| 5,198,739 A * | 3/1993 | Taylor | ............... | G05B 19/33 |
| | | | | 318/661 |
| 5,200,683 A * | 4/1993 | Taylor | ............... | G05B 19/33 |
| | | | | 318/661 |
| 5,204,603 A * | 4/1993 | Taylor | ............... | G05B 19/33 |
| | | | | 318/603 |
| 5,229,697 A * | 7/1993 | Taylor | ............... | G05B 19/33 |
| | | | | 318/563 |
| 5,323,309 A * | 6/1994 | Taylor | ............... | G05B 19/33 |
| | | | | 318/563 |
| 6,525,502 B1 * | 2/2003 | Piedl | ............... | H03M 1/485 |
| | | | | 318/600 |
| 2011/0257931 A1 * | 10/2011 | Oberhauser | ............ | G01D 5/145 |
| | | | | 702/151 |

FOREIGN PATENT DOCUMENTS

| | | |
|---|---|---|
| EP | 1942315 A2 | 7/2008 |
| JP | 2004226200 A | 8/2004 |

OTHER PUBLICATIONS

International Preliminary Report on Patentability Application No. PCT/EP2012/072999 Completed: Feb. 5, 2015 6 pages.

International Search Report and Written Opinion of the International Searching Authority Application No. PCT/EP2012/072999 Completed: Aug. 1, 2013; Mailing Date: Aug. 8, 2013 8 pages.

* cited by examiner

RESOLVER POSITIONING SYSTEM, ROBOT AND METHOD THEREFOR

TECHNICAL FIELD

The invention relates to a resolver positioning system for a robot.

BACKGROUND

It is previously known to use resolvers as position transducers in industrial robots. To achieve a desired high accuracy of a position value obtained with the aid of such a resolver, the resolver is usually arranged such that the operating range of the axis covers a plurality of revolutions of the resolver. This can be achieved, for example, by mounting the resolver on the shaft of a motor which drives the robot axis via a gear. However, this solution has the drawback that the resolver signal does not give an unambiguous indication of the position of the axis. Therefore, the equipment must be supplemented with electronic members in the form of counters, memories, etc., which continuously keep track of within which resolver revolution the axis is at the moment. These members must be reset when putting a robot into service and thereafter after each voltage drop out or other switch-off of the voltage supply of the robot. These so-called synchronization operations require time and manual effort. Therefore, it is also known with so-called absolute-measuring position transducer systems, i.e. systems which provide an unambiguous—and accurate—determination of the position of a robot axis without requiring any synchronization operations. It has been proposed to design such a system with two resolvers for each robot axis. One resolver is arranged so as to rotate a plurality of revolutions when the robot axis moves between the limits of its operating range, thus making possible an accurate determination of the position. The other resolver is arranged so as to rotate less than one revolution when the robot axis moves between the limits of its operating range, and with the aid of this resolver an unambiguous determination may be obtained as to within which revolution the first resolver is situated.

Thus, by combining the output signals of the two resolvers, an unambiguous determination of the position of the robot axis may be obtained. However, this solution requires two resolvers per robot axis and is therefore complicated and expensive. In such a position transducer equipment using two resolvers per robot axis, these have been connected to a control system common to all robot axes, which system then comprises supply and sensing members for the resolvers. Since each resolver has three windings, an extensive cable arrangement between the resolvers and the control system is then required. Such a cable arrangement will be expensive and bulky. This is particularly the case with absolute-measuring position transducer systems having two resolvers per robot axis. From EP-A-177 901 it is previously known to provide an absolute-measuring position transducer system for an industrial robot by arranging for each robot axis two transducers, i.e. a resolver and a pulse transducer with associated circuits for sensing the direction of movement and counting the aggregate number of revolutions of the axis. In normal operation, the number of whole revolutions for each axis, obtained from the sensing circuits of the pulse transducer, is combined in a calculation circuit with the angular position within each revolution, which is obtained from the resolver of the same axis. In case of drop out of the supply voltage, the pulse transducer with associated reading circuits is supplied from a battery and stores a value which correctly indicates the number of whole revolutions of the axis independently of movements of the robot during the voltage drop out period. The pulse transducer may be fed from an oscillator with a low on/off ratio in order to reduce the power consumption during the battery supply interval. Thus, in this known system, the resolver with its high current consumption is not used during the battery feed interval, but the resolver is supplement with another type of position transducer, a pulse transducer, which in itself has a low power consumption. In the system known from EP-A1-0 177 901, there are thus required for each axis a resolver and a transducer with associated sensing and storage circuits. A typical industrial robot has six axes, and the absolute-measuring function is thus obtained at the cost of a considerable complication and increase in price of the robot. Further, an absolute-measuring position transducer system for an industrial robot, which determines the axis positions with high accuracy but which has a relatively simple and inexpensive design with respect to both the transducer units and the required cable arrangement is known from EP-A1-0 406 740.

SUMMARY

Robots being in battery mode generally consume a lot of battery power, which require utilization of large and costly batteries. It is generally desirable to be able provide robots requiring smaller and cheaper batteries, still allowing the same safety aspects.

An object of the present invention is to provide a resolver positioning system allowing a robot to require lower energy consumption.

This object is according to the present invention attained by a resolver positioning system as defined by the appended claims.

When a robot is in battery mode a pulse generator on a Serial Measurement Board sends a pulse out to an excitation coil in a resolver. The resolver reply with signals x and y, which are sent into two comparators, see FIG. 8a. If the signal from the resolver is positive, a digital 1 is read from the comparator. When the resolver turns one revolution the voltage of x and y can be represented by a circle. The value from the two comparators shows in which quadrant the resolver is standing in. By counting the changes of the quadrants, the position of the resolver can be evaluated with a resolution of ¼ revolutions, see FIG. 8b. For correct evaluation the axis may not turn more than ¼ revolutions between the measured samplings.

A significant power is used to send out the pulse from the pulse generator and to power the microcontroller to handle the pulse. In order to reduce the power consumption the pulse frequency must be as low as possible. When the robot axis is standing still the pulse frequency can be low but it must increase if the axis starts to move in order not to lose any quadrant change information.

Figure 8A:
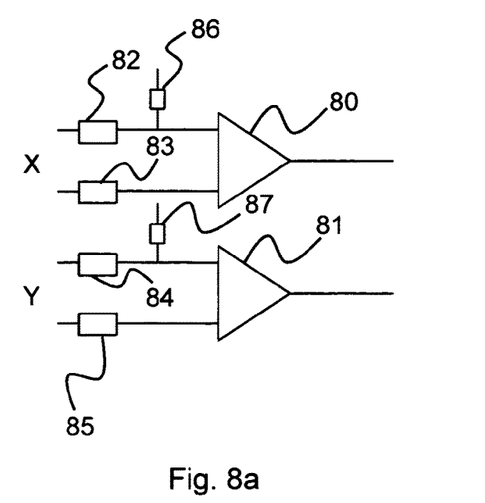
FIGS. 8a and 8b illustrates a quadrant position detection operation for a low power comparator circuit.
Figure 8B:
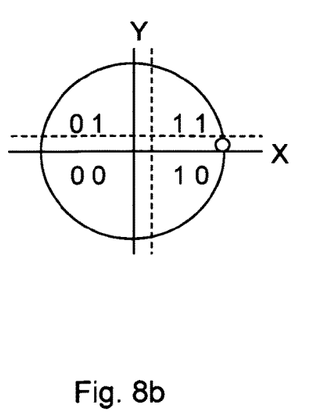

Due to the fact that the signals always have a noise, represented by a small circle in FIG. 8b, a single quadrant change indication from a comparator can not with certainty indicate a moving axis. If the axis has been stopped on a quadrant change the noise will generate moving axis indications, resulting in continuous high power supply current from the battery. To get a safe moving axis detection, and keep battery consumption low, two quadrant changes has to be verified before the high frequency pulsing is starting. If the axis starts to accelerate with an acceleration of a revolutions/s$^2$ the lowest possible sampling speed will be $$\sqrt{\frac{1}{2a}} * (\sqrt{2} - 1)$$

in order to make sure that one sampling in the second quadrant can be made.

By making it possible to offset the output from the comparators, an axis movement can be detected after moving one quadrant. The lowest sampling time will then be $$\sqrt{\frac{1}{2a}}.$$

This makes it possible to reduce the battery current to 0.41 times the old current, which will result in a possibility to use smaller and cheaper batteries.

With the possibility to offset the input to the comparators, it is possible to change the reference level for detection of the resolver signals. The change needs only to be larger than the normal noise level on the resolver input signals in battery mode. By making two subsequent readings with a time difference of 2 μs and with changed reference between the readings a verification of the status of a quadrant position can be evaluated. If the two readings are different, such as 1,1 and 0,1, this indicates that the resolver is standing close to the quadrant boarder and the last evaluation of a quadrant is still valid. Only if the two readings indicate the same, new quadrant, such as 1,1 and 1,1, the new value is used. With this algorithm the noise will not generate indications of a moving axis at any angle of the circle. The result is that it is now possible to indicate moving axis only after one quadrant change. The lowest possible sampling time will then be $$\sqrt{\frac{1}{2a}}$$

as long as the noise is low compared to the signal max amplitude. The battery current can thus be reduced by a factor of ($\sqrt{2}-1$), equal to 0.41.

By providing a resolver positioning system for a robot, which system is connectable to a battery supply and is drivable in a pulsed mode, the system comprising: a resolver arranged to detect an axis position of a robot; a first comparator connected to the resolver for reading of a first resolver value from the resolver, wherein the first comparator comprises means to provide two different reference levels for the first resolver value; a second comparator connected to the resolver for reading of a second resolver value from the resolver, wherein the second comparator comprises means to provide two different reference levels for the second resolver value; and a controller connected to the first and second comparators, wherein the controller is configured to provide a quadrant evaluation of the axis position from the first and second resolver values, a sampling rate of a pulse generator thereof can be kept at a minimum since a changed axis position can be detected faster and the battery supply for the resolver positioning system can thus be made with lower capacity. Battery consumption can with this resolver positioning system be considerably reduced in comparison with previous solutions.

Preferably, a first resistor is connected to an input of the first comparator and a second resistor is connected to an input of the second comparator, in order to provide the comparators with two different reference levels.

The difference between the two different reference levels are advantageously at least equal to a noise level of the first resolver value and second resolver value, respectively, to secure that the quadrant readout is correct.

The controller is preferably configured to change between the two reference levels of the first comparator and the second comparator between two consecutive readings of the first resolver value and the second resolver value, respectively.

The controller is preferably configured to increase the sampling frequency of the resolver positioning system when a change of axis position is determined, in order to maintain quadrant information also with a moving axis.

The controller is preferably configured to detect a change in axis position only when two consecutive readings of the first and second comparators, separated by a change of reference level, both indicate a new resolver value, in order to not unnecessarily increase the sampling frequency.

By providing a method for detecting a change in positing of an axis of a robot, comprising the following steps: firstly, reading a first resolver value from a first comparator of a resolver positioning system, and reading a second resolver value from a second comparator of the resolver positioning system, wherein the first and second comparators are configured with a first reference value; secondly, reading a first resolver value from the first comparator, and reading a second resolver value from the second comparator, wherein the first and second comparators are configured with a second reference value different from the first reference value; and detecting a change in position of an axis of a robot only when the first reading indicates a new resolver value and the second reading indicates the same new resolver value, a sampling time of a pulse generator of the resolver positioning system can be kept at a minimum for longer times since a change in axis position can be detected faster, allowing the resolver positioning system to be provided with a battery supply having lower capacity. In normal condition a robot is standing still when in battery mode, and only exceptionally moves.

A robot comprising a resolver positioning system is also provided.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

By way of example, the invention will now be described in greater detail with reference to the accompanying drawings.

Figure 1:
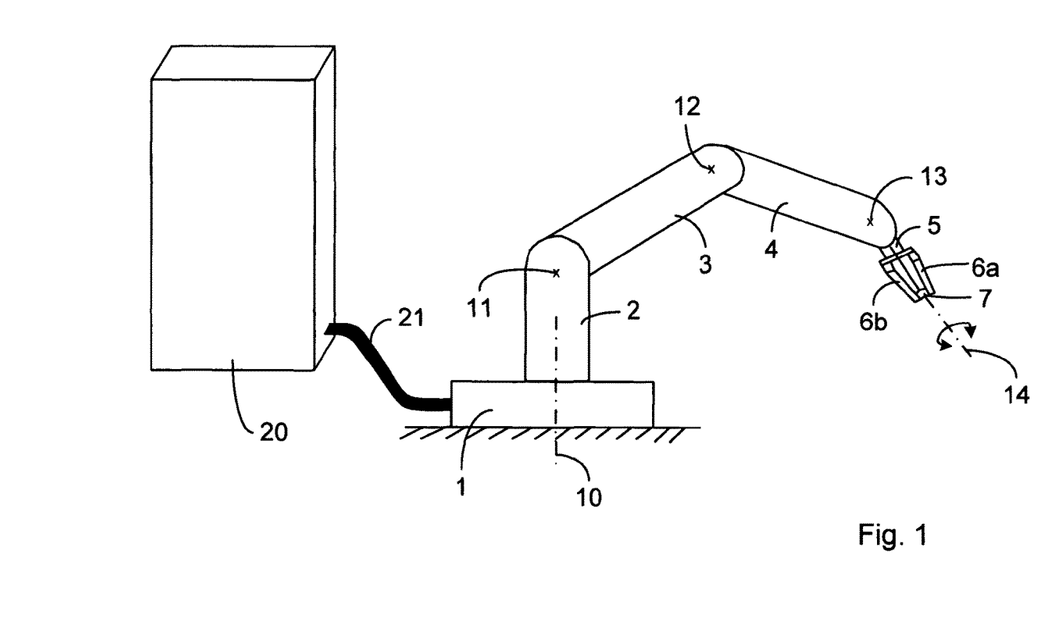
FIG. 1 illustrates a basic configuration of an industrial robot.

FIG. 1 schematically shows an industrial robot, known per se. It has a base plate 1 mounted on a foundation, a lower part 2 which is rotatable around an axis to perpendicular to the base plate, a lower arm 3, which is rotatable around an axis 11 perpendicular to the plane of the paper, an upper arm 4 which is rotatable in relation to the lower arm 3 around an axis 12 perpendicular to the plane of the paper, and a wrist 5 which is rotatable in relation to the upper arm 4 around an axis 13 perpendicular to the plane of to the paper. The robot wrist 5 supports a tool, for example a gripping device with jaws 6a and 6b, for gripping an object 7. The tool is rotatable in relation to the robot wrist 5 around an axis 14. Thus, the robot has five axes of movements, each one with a drive motor and with position transducers for sensing the actual rotational angle in the corresponding axis. The robot has a control system 20 which is connected to the robot with the aid of a cable 21. The control system generates, in a known manner, desired position values for the various axes based on a program stored into the control system, compares these desired values with the actual position values for the various axes and generates, in dependence thereon, control signals for the drive motors of the axes.

Figure 2:
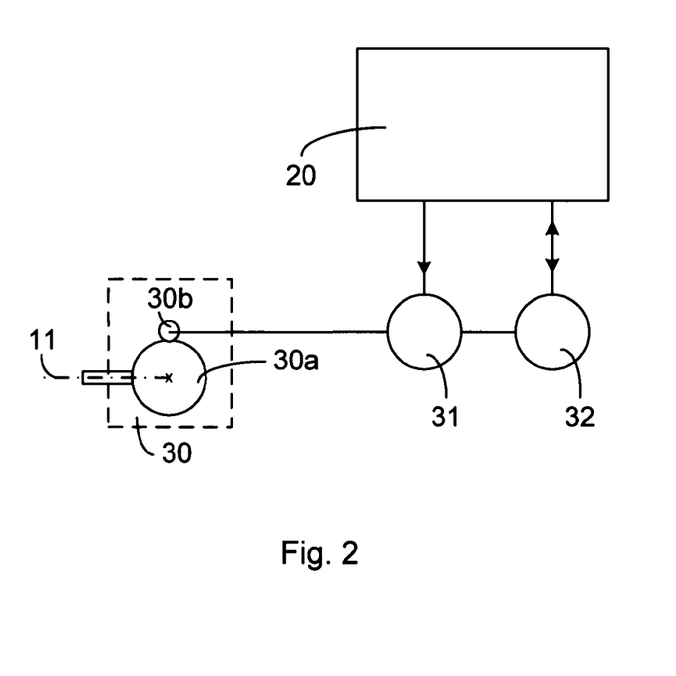
FIG. 2 illustrates a basic configuration of a resolver positioning system.

FIG. 2 shows how, in a manner known per se, the drive and position sensing system may be designed for one of the axes of movement of the robot, for example, the axis 11. The drive motor 31 of the axis is connected to the robot axis via a gear 30, for example a reduction gear set with the gear wheels 30a and 30b. The drive motor 31 is supplied from the control system 20 of the robot. A resolver 32 is mechanically connected to the motor shaft for sensing the shaft rotational angle position. The resolver 32 is fed from the control system 20, and its two sensing windings are connected to the control system, which in a known manner, in dependence on the voltages induced in the two sensing windings of the resolver by the magnetic field from the excitation winding of the resolver, generates a signal corresponding to the rotational angle of the resolver. In a system of this known type, the cable arrangement is extensive, since each one of the three windings of each resolver must be connected to the control system 20. Further, the system shown in FIG. 2 is not absolute-measuring and therefore, as mentioned in the introduction, a manual synchronization operation is required when putting the robot into operation or when resuming operation after a power failure. In a position transducer system of absolute-measuring type, known per se, with two resolvers for each robot axis, the cable arrangement is still more complicated.

Figure 3:
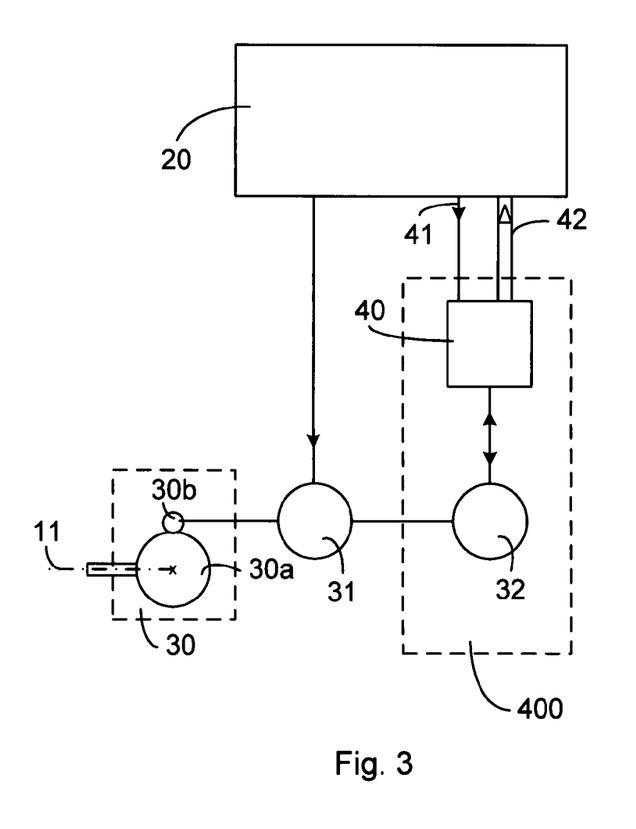
FIG. 3 illustrates a resolver positioning unit connected to a robot axis and to a common control system.

FIG. 3 shows a part of a position transducer system, known per se, which belongs to a robot axis, for example, the axis 11. Each axis has an axis unit 400 comprising a resolver 32, connected to the shaft of the drive motor 31, and an electronic unit 40 for supplying the resolver 32 and for processing of the output signals of the resolver 32. The latter are converted in the electronic unit 40 into a digital signal which is supplied to the control system 20 via a data line 42. The control system delivers to each one of the axis units a supply voltage via line 41.

Figure 4:
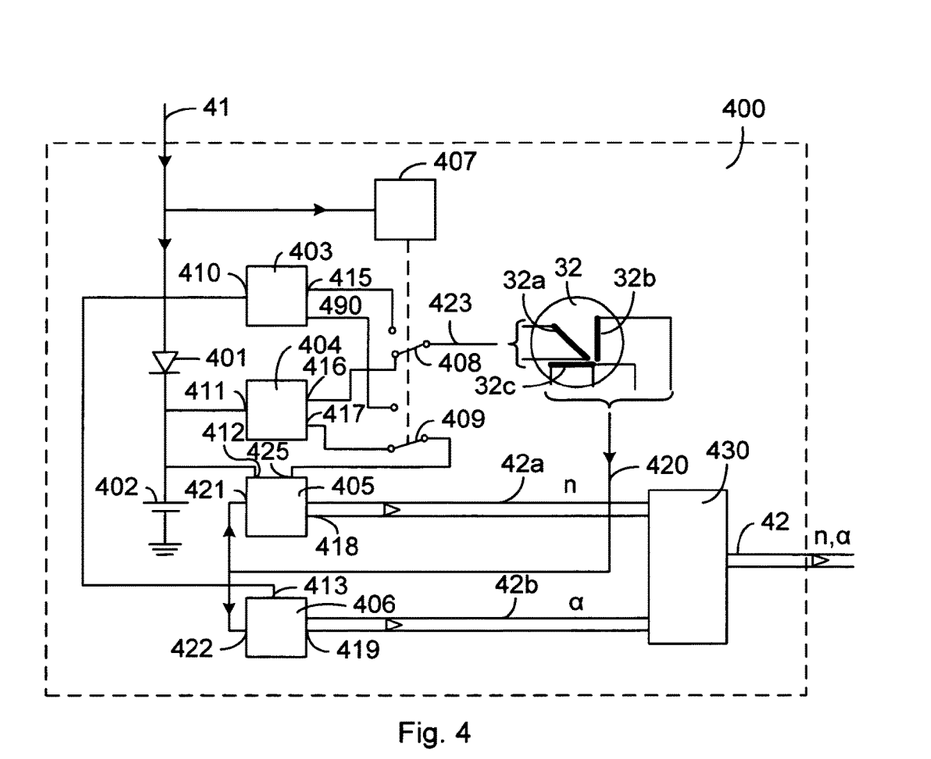
FIG. 4 illustrates a design of a resolver positioning unit for one of a robot axes.

FIG. 4 shows an example of the design of the axis unit 400 in FIG. 3, known per se. The axis unit 400 comprises an oscillator 403 for continuous supply of the resolver 32, an oscillator 404 for pulsed supply of the resolver 32, a revolution counter 405, an RID converter 406 and a voltage-sensing relay 407. The supply input 410 of the oscillator 403 and the supply input 413 of the RID converter 406 are directly connected to the supply line 41 from the control system 20. The supply inputs 411 and 421 of the oscillator 404 and the revolution counter 405 are connected to an accumulator battery 402, which via a diode 401 is connected to the supply line 41.

During normal operation, all four units 403-406 receive supply voltage from the line 41 and are in operation. The necessary charge or compensating charge of the battery 402 may then suitably be made with the aid of a battery charger, not shown in FIG. 4. When the supply voltage is present, the relay 407 is activated and connects the output 415 of the oscillator 403 via the contact 408 and the line 423 to the excitation winding 32a of the resolver 32. At the same time, a signal corresponding to a logical "one" is delivered via the relay contact 409 to the synchronization input 425 of the revolution counter 405.

In case of drop out of the supply voltage from the control system 20, the relay 407 falls back into its home position, with its contacts 408 and 409 assuming the positions shown in FIG. 4. The oscillator 403 and the RID converter 406 do not receive supply voltage and stop working. The oscillator 404 and the revolution counter 405, on the other hand, do receive supply voltage from the battery 402. The output 416 of the oscillator 404 is connected via the contact 408 to the excitation 32a winding of the resolver. From a synchronization output 417 of the oscillator 404 a synchronization signal is delivered via the contact 409 to the synchronization input 425 of the revolution counter 405.

The two sensing windings 32b and 32c of the resolver 32 are connected via lines 420, to the signal input 421 of the revolution counter and the signal input 422 of the RID converter. From the revolution counter 405 a digital signal n is obtained on the output 418 which is supplied via the data line 42a to a communication unit 430 and which indicates within which revolution or within which quadrant the resolver is. From the output 419 of the RID converter 406 there is obtained during normal operation a digital signal α which indicates the rotational angle of the resolver within the revolution or within the quadrant in question and which via the data line 42b, is supplied to the communication unit 430. This unit handles the digital communication with the control system 20 via the bus 42 and forwards measured values n and α to the control system 20.

The oscillator 403 delivers as long as supply voltage is present on the line 41 an alternating voltage of sinusoidal or square shape with a frequency which may be 2-20 KHz. The oscillator 404 delivers on its output 416 a short pulse compared with the pulse length a long period between the pulses. However, the oscillator 404 operates in a pulsed mode, i.e. it delivers short output signals separated by lengthy pauses, for example of 0.5-20 ms. From the output 417 of the oscillator 404 there is obtained a synchronization signal which is a logical "one" during the brief intervals when the oscillator delivers an output pulse and which is a logical "zero" during the pauses between these intervals. During normal operation, i.e. in the presence of supply voltage on the line 41, the relay 407 is activated and the resolver 32 is supplied continuously from the oscillator 403. The resolver counter 405 is continuously activated by synchronization pulses from an output 490 of the oscillator 403 to its synchronization input 425 and the RID converter 406 is in operation. By the combination of the output signals of the revolution counter 405 and the RID converter 406, a quantity can be formed in a simple manner, which within the entire operating range of the robot axis accurately indicates the actual axis position. Provided that the output signal n of the revolution counter indicates the number of quadrants (one fourth of a revolution) that the resolver has rotated from a reference position, the actual position value of the axis is obtained in the following way: $\phi=2\pi n+\alpha$ radians.

In the event of a drop out of the supply voltage on the line 41, only the oscillator 404 and the revolution counter 405 are working. Since both this oscillator 404 and the revolution counter 405 are working in pulsed mode, they may be designed for very low power consumption, and their operation is therefore ensured with the aid of the accumulator battery 402 for very long periods of drop out of the supply voltage.

Figure 6:
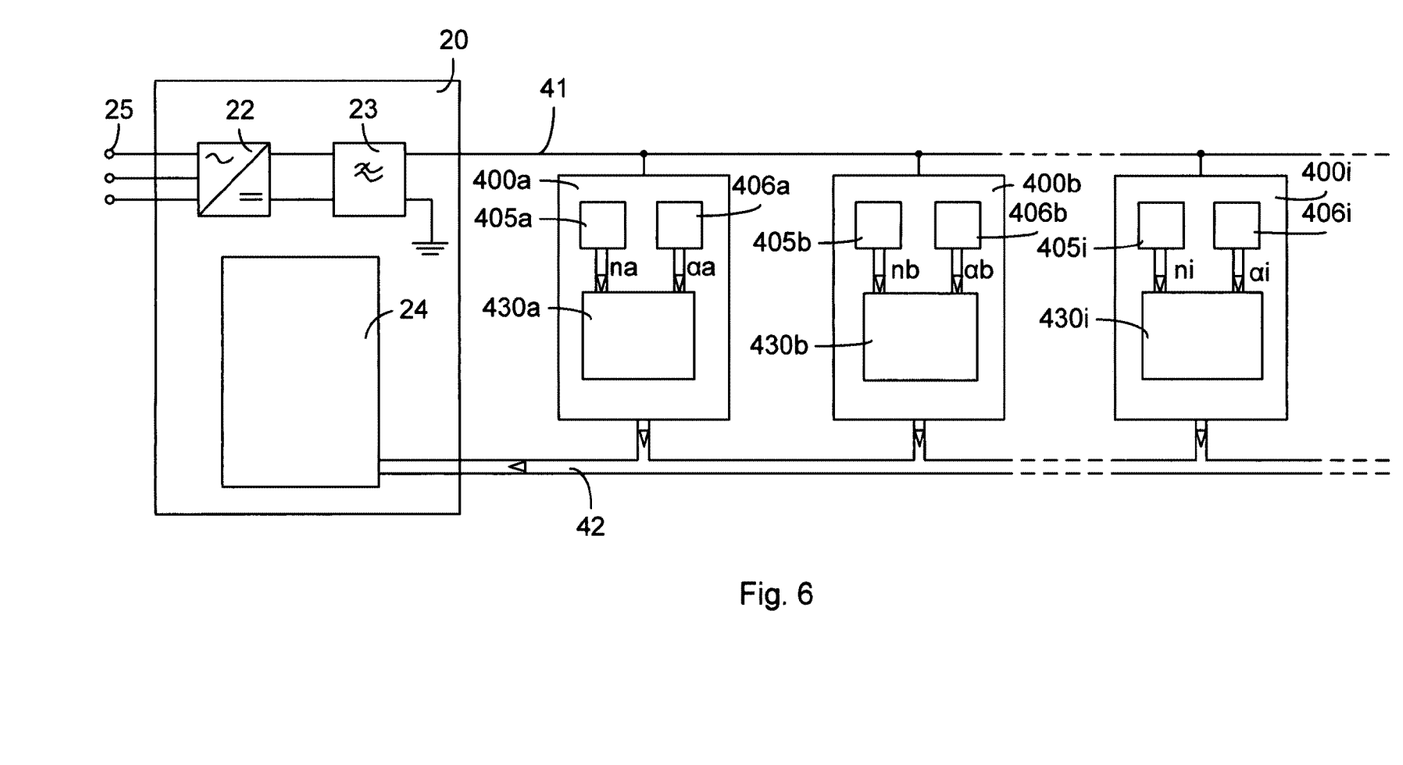
FIG. 6 illustrates an embodiment of a connection of resolver positioning units for various robot axes to a common control system in a resolver positioning system.

FIG. 6 shows how, in a manner known per se, the axis units are connected to the common central control system 20. This comprises a rectifier 22 with terminals 25 for connection to an alternating voltage network, and delivers the supply direct voltage on the line 41 via a smoothing filter 23. The control system 20 further comprises a computer system 24, which via a digital series bus 42 communicates with and receives actual position values from the various axis units 400a, 400b, . . . , 400i. The system has one axis unit for each robot axis. Each axis unit comprises the units shown in FIG. 4, i.e. a resolver with associated supply and sensing members and a battery. Each axis unit is mounted adjacent to an associated robot axis, with the electronic units and the accumulator battery built together with the resolver into one single transducer unit, or with these units arranged in immediate proximity to the resolver. Of the various axis units, for sake of clarity, only the revolution counters 405a to 405i, the RID converters 406a to 406i, and the communication units 430a, 430b, . . . , 430i are shown. The revolution counters deliver, via the communication units and the series bus 42, the signals na, nb, . . . , ni to the computer system 24. The RID converters deliver, via the communication units and the series bus, the signals αa, αb, . . . , αi to the computer system. On the basis of these signals, the computer calculates, in the manner stated above, the actual position values for each robot axis, compares these values with programmed or manually entered desired position values and, in dependence on these comparisons, controls the drive motors of the axes. The system is described with one axis unit for each robot axis. Preferably, the common control system 20 instead comprises some common components for the axis units. The common control system 20 is e.g. provided with two comparators for each resolver, one A/D converter supporting one or more resolvers, one oscillator supporting a complete robot.

The position transducer system described above only constitutes an example of a position transducer system known per se, and such a system may be designed in a great many alternative ways providing an absolute-measuring system. Thus, for example, instead of an accumulator battery in each axis unit, one single accumulator battery may be arranged centrally in the control system 20 or in the robot. Further, instead of the two oscillators 403 and 404 in FIG. 4, one single oscillator may be used, which operates continuously during normal operation and is switched to pulse mode operation in case of a drop out of the supply voltage. Also, the mechanical coupling of the resolver to the motor shaft may be carried out in other ways than that described above. The described sensing of the supply voltage drop out with the aid of voltage sensing members arranged in each axis unit may be replaced by a central sensing operation, carried out in the cabinet of the control system 20, signals for switching of the axis units to the pulse mode operation then being transmitted to these from the control cabinet.

Only one and the same transducer, namely the resolver, is used both during normal operation and for keeping track of the number of full revolutions of the axes during battery operation. This results in a considerable cost saving and a reduction of the complexity of the system compared with the systems described above in which for each axis the resolver must be supplemented with an additional transducer, e.g. an additional resolver or a pulse transducer, with its sensing circuits. The consumption of a resolver which per se is high and which is the reason for the above-mentioned solution with an extra transducer, a pulse transducer with its low current consumption for each axis, is reduced by the novel pulse mode operation of the resolver during battery-powered intervals, to such low values that the battery operation may be maintained also during long interruptions of the normal current supply.

Figure 5:
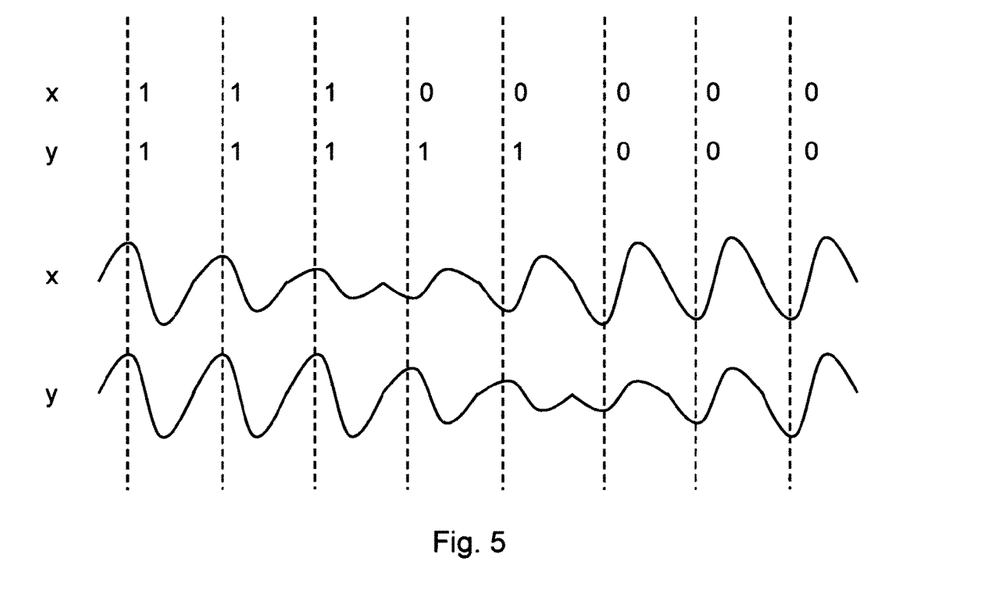
FIG. 5 illustrates changes of quadrant positions.

Example comparator signals X and Y are illustrated in FIG. 5. The hyphened vertical lines represent synchronization signals, at which times readouts are made from the resolver. The comparator signals X and Y illustrated in FIG. 5 provides the following quadrant status series (1,1), (1,1), (1,1), (0,1), (0,1), (0,0), (0,0), (0,0).

Figure 7A:
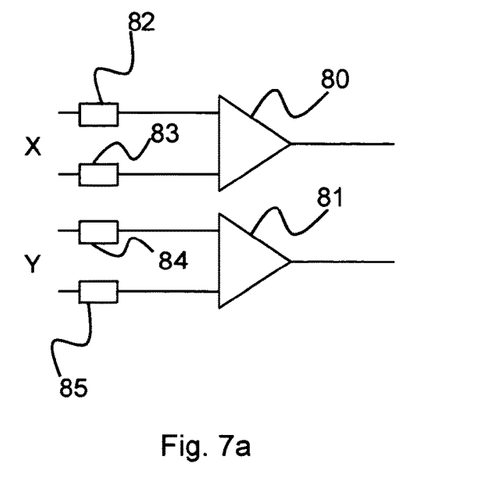
FIGS. 7a and 7b illustrates a quadrant position detection operation for a basic comparator circuit.

FIG. 7a shows a first comparator 80 for a signal X and a second comparator 81 for a signal Y. The first comparator 80 has two inputs, having a first input resistance 82 and a second input resistance 83, respectively. The second comparator 81 has two inputs, having a first input resistance 84 and second input resistance 85, respectively.

Figure 7B:
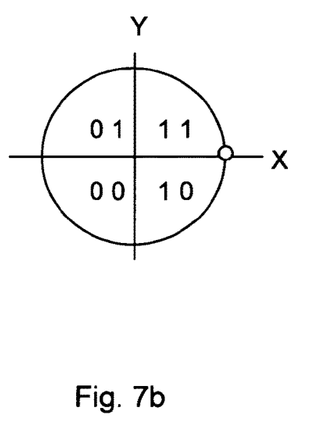

FIG. 7b shows a quadrant position illustration of an axis position of a resolver. When the first comparator 80 is readout indicating a "1" and the second comparator 81 is readout indicating "0", the axis position being detected to be in the "1,0" quadrant. For detection of a counter clockwise movement of the axis position the axis position is close to the X-axis of FIG. 7b, next to quadrant 1,1.

The readout of a "0" or a "1" from a comparator is affected by the noise level of the signal X and Y, respectively. This is represented by a small circle at axis X in FIG. 7b.

FIG. 8a shows the first comparator 80 with a resistor 86 added to one of its inputs, changing the reference level for detection of the signal X. FIG. 8a shows the second comparator 81 with a resistor 87 added to one of its inputs, changing the reference level for detection of the signal Y.

FIG. 8b shows the changed reference levels of the two resolver values with dotted lines. In this case the difference between the original reference level and the changed reference level is equal to the size of the noise level indicated by a small circle between quadrants 1,0 and 1,1.

The change of reference level needs only to be equal to or larger than the normal noise level of the resolver input signals in battery mode (in the figure the noise level and reference change are exaggerated). By making two readings with a time difference of about 2 µs and with moved reference level between the readings their status can be verified with a low sampling frequency. If the two readings are different, such as 1,1 and 1,0, this indicates that the resolver is standing close to the quadrant border and the last evaluation of quadrant is still valid, 1,0 in this example. Only when the two readings indicate the same quadrant, 1,1 in this example, the new value is used and the resolver position system indicates a moving axis. A clockwise change of quadrant will be verified in a corresponding way, when two consecutive readouts, separated by a change of reference level, indicates quadrant 0,0 in this case.

A resolver positioning system for a robot according to the present invention is thus connected to a battery supply 402 and is drivable in a pulsed mode. The resolver positioning system comprises:
 a resolver 32 arranged to detect an axis position of a robot;
 a first comparator 80 connected to the resolver for reading of a first resolver value from the resolver, wherein the first comparator comprises means 82, 83, and 86 to provide two different reference levels for the first resolver value;
 a second comparator 81 connected to the resolver for reading of a second resolver value from the resolver, wherein the second comparator comprises means 84, 85, and 87 to provide two different reference levels for the second resolver value; and
 a controller 20 connected to the first 80 and second 81 comparators, wherein the controller 20 is configured to provide a quadrant evaluation of the axis position from the first and second resolver values.

The means to provide two different reference levels for the first resolver value is preferably a first resistor 86 connected to an input of the first comparator 80. By reading out two consecutive resolver values, e.g. with a time difference of about 2 µs, wherein the first resister 86 is connected to the input in one reading but not in the second reading (or vice versa), two different reference levels are provided.

The means to provide two different reference levels for the second resolver value is preferably a second resistor 87 connected to an input of the second comparator 81. By reading out two consecutive resolver values, e.g. with a time difference of about 2 µs, wherein the second resister 87 is connected to the input in one reading but not in the second reading (or vice versa), two different reference levels are provided.

An alternative way to provide two different reference levels from the comparators, is e.g. to utilize a controllable comparator with built-in functionality for offsetting the detection levels thereof.

The difference between the two different reference levels are preferably at least equal to a noise level of the first resolver value and second resolver value, respectively. The noise level of signal from a resolver is easily estimated by e.g. measurement thereof.

The controller 20 is preferably configured to change between the two different reference levels of the first comparator and the second comparator between two consecutive readings of the first resolver value and the second resolver value, respectively. The controller 20 is preferably also configured to increase a sampling frequency of the resolver positioning system when a change of axis position is verified by two consecutive reading with different reference levels. The increased sampling frequency is preferably set in relation to a maximum revolution per minute for the axis 11. A high sampling frequency is e.g. 1 kHz for a typical robot. A low sampling frequency, utilized for the pulsed battery mode is e.g. 100 Hz for a typical robot. This low sampling frequency is set in relation to e.g. expected acceleration in a battery mode, disturbances such as someone bumping into the robot or a break being released. The controller 20 is also preferably configured to verify a new axis position only when two consecutive readings of the first and second comparators 80 and 81, separated by a change of reference level, both indicate a new resolver value.

A method for detecting a change in positing of an axis of a robot according to the present invention thus comprises the following steps:
 firstly, reading a first resolver value from a first comparator 80 of a resolver positioning system, and reading a second resolver value from a second comparator 81 of the resolver positioning system, wherein the first and second comparators are configured with a first reference value;
 secondly, reading a first resolver value from the first comparator, and reading a second resolver value from the second comparator, wherein the first and second comparators are configured with a second reference value different from the first reference value; and
 detecting a change in position of an axis 11 of a robot only when the first reading indicates a new resolver value and the second reading indicates the same new resolver value.

The reference value of the first and second comparator, respectively, is preferably changed by changing a resistance value of an input of the first and second comparator, respectively.

The invention has mainly been described above with reference to a few examples. However, as is readily appreciated by a person skilled in the art, other embodiments than the ones disclosed above are equally possible within the scope of the present invention, as defined by the appended claims.

The invention claimed is:

1. A method for detecting a change in positing of an axis of a robot, comprising the following steps:
 firstly, reading a first resolver value from a first comparator of a resolver positioning system, and reading a second resolver value from a second comparator of said resolver positioning system, wherein said first and second comparators are configured with a first reference value;
 changing said first reference value to a second reference value different from said first reference value;
 secondly, reading a first resolver value from said first comparator, and reading a second resolver value from said second comparator, wherein said first and second comparators are configured with the second reference value; and
 detecting a change in position of an axis of a robot only when said first reading indicates a first new resolver value and said second reading indicates a second new resolver value that is the same as the first new resolver value.

2. The method according to claim 1, wherein the changing step includes changing a resistance value of an input of said first and second comparators.

3. The method according to claim 1, wherein a difference of the first and second reference values is set to at least a noise level of the first and second resolver values.

4. A resolver positioning system for a robot, which system is connectable to a battery supply and is drivable in a pulsed mode, said system comprising:
- a resolver arranged to detect an axis position of a robot;
- a first comparator connected to said resolver and configured to read a first resolver value from said resolver, wherein said first comparator is configured to provide two different reference levels for said first resolver value;
- a second comparator connected to said resolver and configured to read a second resolver value from said resolver, wherein said second comparator is configured to provide two different reference levels for said second resolver value; and
- a controller connected to said first and second comparators, wherein said controller is configured to provide a quadrant evaluation of said axis position from said first and second resolver values, and wherein said controller is configured to change between the two reference levels of said first comparator and said second comparator between two consecutive readings of said first resolver value and said second resolver value, respectively.

5. The resolver positioning system according to claim 4, comprising a first resistor connected to an input of said first comparator and a second resistor connected to an input of said second comparator.

6. The resolver positioning system according to claim 4, wherein a difference between the two different reference levels are at least equal to a noise level of said first resolver value and second resolver value, respectively.

7. The resolver positioning system according to claim 4, wherein said controller is configured to increase a sampling frequency of said resolver positioning system when a change of axis position is determined.

8. The resolver positioning system according to claim 4, wherein said controller is configured to detect a change in axis position only when two consecutive readings of said first and second comparators, separated by a change of reference level, both indicate a new resolver value.

9. A robot drivable in pulsed mode, comprising a battery supply and a resolver positioning system according to claim 4.

10. The method according to claim 1, wherein the first and second comparators each include two analog input terminals and one binary digital output terminal; and
- wherein the method further comprises inputting a respective analog comparator signal into each of the two analog input terminals of the first and second comparators.

11. The resolver positioning system of claim 4, wherein the first comparator and the second comparator each include two analog input terminals and one binary digital output terminal.

* * * * *